United States Patent
Newcomb et al.

(10) Patent No.: US 7,907,273 B2
(45) Date of Patent: Mar. 15, 2011

(54) SYSTEM AND METHOD FOR MEASURING STARCH GELATINIZATION

(75) Inventors: Mark D. Newcomb, Independence, MN (US); Jason L. Shelton, Monticello, MN (US); Julie R. Schuette, Buffalo, MN (US); James E. Graves, Lilburn, GA (US)

(73) Assignee: Cargill, Incorporated, Wayzata, MN (US)

( * ) Notice: Subject to any disclaimer, the term of this patent is extended or adjusted under 35 U.S.C. 154(b) by 220 days.

(21) Appl. No.: 12/218,927

(22) Filed: Jul. 18, 2008

(65) Prior Publication Data

US 2009/0061055 A1    Mar. 5, 2009

Related U.S. Application Data

(60) Provisional application No. 60/961,155, filed on Jul. 19, 2007.

(51) Int. Cl.
    *G01J 3/28*    (2006.01)
(52) U.S. Cl. .................. 356/300; 250/339.07
(58) Field of Classification Search .............. 356/300; 250/339.07
See application file for complete search history.

(56) References Cited

U.S. PATENT DOCUMENTS

| | | | |
|---|---|---|---|
| 4,640,843 A * | 2/1987 | Matuszak et al. | 426/560 |
| 4,734,294 A * | 3/1988 | Spiel et al. | 426/620 |
| 6,507,022 B1 | 1/2003 | Salmond et al. | |
| 7,057,164 B2 | 6/2006 | Springsteen et al. | |
| 7,174,672 B2 | 2/2007 | Beck | |
| 2002/0154304 A1 * | 10/2002 | Bachman et al. | 356/417 |
| 2003/0233984 A1 | 12/2003 | van de Ligt et al. | |
| 2005/0000457 A1 | 1/2005 | Beck | |
| 2005/0214419 A1 | 9/2005 | Aberle et al. | |
| 2005/0214440 A1 | 9/2005 | Aberle et al. | |
| 2006/0064780 A1 | 3/2006 | Munck et al. | |
| 2007/0005451 A1 | 1/2007 | Iwig et al. | |

FOREIGN PATENT DOCUMENTS

| | | | |
|---|---|---|---|
| JP | 03-160345 | * | 7/1991 |
| WO | WO 2007/019847 | | 2/2007 |

OTHER PUBLICATIONS

"A Maltose Biosensor for Determining Gelatinized Starch in Processed Cereal Foods," General Chemistry, vol. 81, No. 1, 2004 pp. 6-9.

"Determination of Thermal and Retrogradation Properties of Rise Starch Using Near-infrared Spectroscopy," J. Bao et al, Journal of Cereal Science 46 (2007) pp. 75-81.

"Analysis on Near Infrared Spectra of Gelatinized Starch," Nippon Shokuhin Kagaku Kaishi vol. 50, No. 4, (2007) pp. 174-179.

"Measurement of the Degree of Starch Gelatinization in Fresh Pasta by Near Infrared Reflectance Analysis," S. Zardetto, vol. 55, Part 7, 2004 pp. 662-668.

\* cited by examiner

*Primary Examiner* — Kara E Geisel

(57) ABSTRACT

A system for measuring starch gelatinization in a feed production system. The system includes a feed production system configured to generate an extruded feed from a feed mixture using a combination of steam and pressure to cook the feed in an extruder, a near infrared spectrometer configured to measure a degree of starch gelatinization for the extruded feed, and a starch gelatinization measurement engine configured to generate a measurement of the degree of starch gelatinization in the extruded feed.

24 Claims, 3 Drawing Sheets

SYSTEM AND METHOD FOR MEASURING STARCH GELATINIZATION

CROSS-REFERENCE TO RELATED APPLICATION

This application claims the benefit of U.S. Provisional Patent Application Ser. No. 60/961,155, filed Jul. 19, 2007, entitled SYSTEM AND METHOD FOR MEASURING STARCH GELATINIZATION, the disclosure of which is incorporated herein by reference.

BACKGROUND

The present application relates generally to the field of systems and methods for animal feed production. Specifically, the present application is directed to a system and method for determining starch gelatinization in an animal feed production system.

Animal feeds are created by processing a number of ingredients to create an animal feed product. Feed products may be extruded, expanded, or pelleted by methods well known in the art as described in the 2005 edition of Feed Manufacturing Technology V., Eileen K. Schofield (Technical Editor), American Feed Industry Association, Arlington, Va., and earlier editions. During extrusion, expansion, or pelleting, starch in the feed product is gelatinized which improves digestibility. Additionally, extrusion, expansion, or pelleting improves the storage life of the product by reducing enzyme activity (e.g., lipase activity). Extrusion, expansion, and pelleting processing conditions (e.g., temperature, pressure, and moisture) may be controlled to produce varying levels of starch gelatinization. Starch gelatinization is a process that breaks down the intermolecular bonds of starch molecules in the presence of water and temperature and allows the hydrogen bonding sites (the hydroxyl hydrogen and oxygen) to engage more water. This penetration of water increases randomness in the general structure and decreases the number and the size of the crystalline region. The crystalline region does not allow water entry. When heat is applied this region will be diffused, so that the chains start to pull out from each other.

In the pet food industry, a majority of diets are extruded. High temperatures introduced from steam or caused by pressure, "cook" the animal feed product. If the product is not extruded properly, the feed product is susceptible to either overcooking or undercooking. Undercooking the product can result in product that contains starch which will not be fully digested causing the potential for "leaks" of starch into the hindgut including the distal portion of the small intestine, cecum, and large intestine or colon depending upon the animal species. When starch reaches the hindgut, the microbes digest it very rapidly which can contribute to gastrointestinal issues for animals ingesting the feed. Overcooking can cause similar issues, although based on a different mode of action. Overcooking can lead to retrograde starch being formed in the feed product. Retrograde starch is an irreversible insoluble starch formed when the starch molecules are attracted to each other and form bundles of parallel polysaccharide chains by the formation of hydrogen bonds between hydroxyl groups on neighboring molecules. Retrograde starch is not fully digestible by the small intestine of the animals such that the starch reaches the hindgut where it is utilized by microbes as described above.

The degree of cooking has traditionally been measured by sending the finished product to a lab to perform a wet chemistry analysis and measure the level of starch gelatinization. The process usually takes a few days up to a week. During this testing period, the product is usually already being bagged and shipped to distributors. Further, the results generated from traditional measurement may vary widely based on the procedure each individual testing laboratory uses to measure gelatinized starch (i.e., the analysis for the same product may vary depending on which lab analyzed the product).

What is needed is a system and method for rapidly and accurately measuring starch gelatinization in an animal feed product during or contemporaneously with the production of the animal feed product. What is further needed is such a system and method configured to determine whether overcooking or undercooking has occurred such that remedial action may be taken to correct any issues in the production process.

SUMMARY

One embodiment of the present application relates to a system for measuring starch gelatinization in a feed production system. The system includes a feed production system configured to generate an extruded feed from a feed mixture using a combination of steam and pressure to cook the feed in an extruder, a near infrared spectrometer configured to measure a degree of starch gelatinization for the extruded feed, and a starch gelatinization measurement engine configured to generate a measurement of the degree of starch gelatinization in the extruded feed.

Another embodiment of the present application relates to method for measuring starch gelatinization in a feed production system. The method includes receiving an extruded feed created from a feed mixture using a combination of steam and pressure to cook the feed in an extruder and generating a near infrared spectrograph to determine a degree of starch gelatinization in the extruded animal feed.

Yet another embodiment of the present application relates to a system for measuring starch gelatinization in a feed production system. The system includes a feed production system configured to generate an animal feed from a feed mixture, a near infrared spectrometer configured to measure a degree of starch gelatinization for the animal feed, and a starch gelatinization measurement engine configured to generate a measurement of the degree of starch gelatinization in the animal feed.

DETAILED DESCRIPTION

In the following description, for the purposes of explanation, numerous specific details are set forth in order to provide a thorough understanding of the present invention. It will be evident to one skilled in the art, however, that the exemplary embodiments may be practiced without these specific details. In other instances, structures and devices are shown in diagram form in order to facilitate description of the exemplary embodiments.

Figure 1:
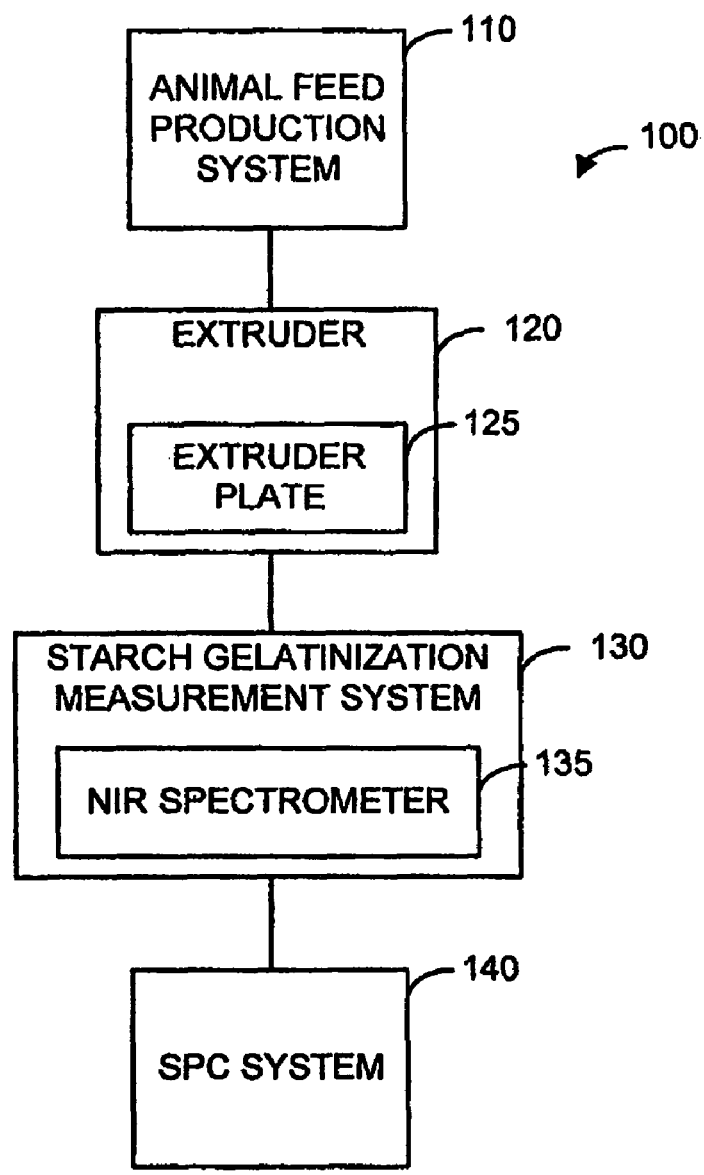
FIG. 1 is a system for generating quick, accurate measurements of starch gelatinization in a feed production system to reduce the amount of over and/or undercooking, according to an exemplary embodiment.

Referring to FIG. 1, a system 100 for generating quick, accurate measurements of starch gelatinization in a feed production system to reduce the amount of over and/or undercooking is shown, according to an exemplary embodiment. System 100 includes an animal feed production system 110, an extruder 120, including an extruder plate 125, starch gelatinization measurement system 130, including a near infrared spectroscope 135, and a statistical process control (SPC) analysis engine 140.

System 100 may be an animal feed production system for producing an extruded feed, which traditionally undergoes a high degree of processing. Extrusion processing generally includes the steps of extruding, drying, and coating. Processing such as extruding, expanding and pelleting the combination of animal feed ingredients gelatinizes the starch which improves digestibility and also improves storage life by reducing enzyme activity. The product may be cooled after extrusion, and then sized to meet feeding requirements, or the product may be further treated with an omega-3 FA source, other oils or fats, additional trace nutrients, vitamins, and/or flavor enhancers. Ingredients such as omega-3 FA, other oils or fats, additional trace nutrients, vitamins, and/or flavor enhancers may be added to the basic animal feed ingredients before and/or during processing, or may be added to the feed product after processing.

Animal feed production system 110 may be any system or combination of systems configured to generate a feed mixture including amounts of ingredients based on an animal feed formulation. The animal feed formulation may vary widely based on a large number of factors, including, but not limited to the type of animal, the age of the animal, physical characteristics of the animal, the animal's environment, the time of year, market timing, desired output, etc. The feed mixture generated by animal feed production system 110 may be provided to extruder 120 for final processing.

Extruder 120 may be a long barrel with a screw auger, single or multiple, inside which is specially designed to subject feed mixtures to high heat and steam pressure. Both the steam and the pressure can be adjusted during the extrusion process to affect the level of starch gelatinization that occurs. One method for changing the pressure of the extrusion process is by modifying the size and/or configuration of the extrusion plate 125. Extrusion plate 125 may alternatively be implemented as an extrusion nozzle or die. Processing such as extruding, expanding, and/or pelleting the feed mixture gelatinizes the starch in the feed mixture which improves digestibility and also improves storage life by reducing enzyme activity. The product may be cooled after extrusion, and then sized to meet feeding requirements.

The term "pellet" may refer to a product made using a pellet mill, expander, extruder, or like device. For example, the feed product may be processed in pellet form by forcing the combination of corn components through an orifice (extrusion plate 125) and dividing the output into segments. This may be done by either an extrusion process, expansion process or a pelletizing process. Thus, it should be understood that use of the term "pellet" is not meant to imply or require that any particular process be used to prepare the feed product. Rather, "pellet" is intended to refer to the final solid conglomerated form of the feed product. The term "nugget" is also used herein to refer to the final solid conglomerated form of the feed product.

Starch gelatinization measurement system 130 may be a system used to measure the degree of starch gelatinization that exists in the animal feed following extrusion through extruder 120. The degree of starch gelatinization may provide an indication of how much the feed mixture has been cooked during the extrusion and other production processes. If the cooking is too high or too low, process conditions can be changed to ensure a consistent output from system 100. The degree of starch gelatinization may be determined using near infrared spectrometer 135.

Near infrared spectrometer 135 is an optical instrument used to measure properties of light over the specific portion of the electromagnetic spectrum in the near infrared range. Near infrared spectroscopy (NIRS) is a spectroscopic method utilizing the near infra-red region of the electromagnetic spectrum (from about 800 nm to 2500 nm). The molecular overtone and combination bands seen in the near-IR are typically very broad, leading to complex spectra. It can be difficult to assign specific features to specific chemical components. Multivariate (multiple wavelength) calibration techniques (e.g., principal components analysis or partial least squares) are often employed to extract the desired chemical information. Careful development of a set of calibration samples and application of multivariate calibration techniques is essential for near infrared analytical methods.

Starch gelatinization has been measured using differential scanning calorimetry, particle sizing using laser diffraction, wet chemistry, etc. However, these methods require shipping samples to a laboratory for testing. The results generated using traditional method may be correlated to near infrared reflectance (NIR) values. System 130 is configured to detect total and gelatinized starch values using NIR scanning. The detection may be implemented by providing equation to the NIR scanner based on the correlations to wet chemistry, or other testing, values.

System 130 may be directly coupled to system 100 such that output from extruder 120 is measured directly in the production system without removing samples from the product flow. Alternatively system 130 may be a separate system configured to receive samples collected from the output of extruder 120 for analysis.

Starch gelatinization engine 100 is configured to utilize a gelatinized starch assay that can accurately measure gelatinized starch and be able to detect differences. The assay utilized may be a variation of typical gelatinization starch assay, the main difference being the amount of time for the assay. System 130 is configured to use a one hour assay instead of the traditional 2 hour assay. The assay may be generated by modifying a plurality of inputs including time, temperature, and specific enzyme (e.g., strength, source, amount). The variables may be adapted to maximize the correlation potential for a chosen wet chemistry analysis to NIR spectrograph results. In addition, the strong correlation of the chosen wet chemistry assay may be maintained with respect to a "reference" method and/or expected results in the physiological system of an animal. An exemplary assay is described in an article entitled "A Maltose Biosensor for Determining Gelatinized Starch in Processed Cereal Foods," General Chemistry, Vol. 81, No. 1, 2004 pp. 6-9.

Starch gelatinization measurement engine 130 may further be coupled to a statistical process control (SPC) analysis engine 140 configured to evaluate the employed cook process to identify trends and take corrective action before the degree of cooking falls outside of acceptable ranges. Over and/or undercooking can lead to digestive problems in animals. System 100 may be utilized to safeguard against selling over or undercooked feeds since the test is implemented during the feed production process, allowing for adjustments during the processing run. SPC analysis engine 140 can detect trends that require corrective action and/or trends that do not require correct action to help producers determine when and if remedial action is needed.

Figure 2:
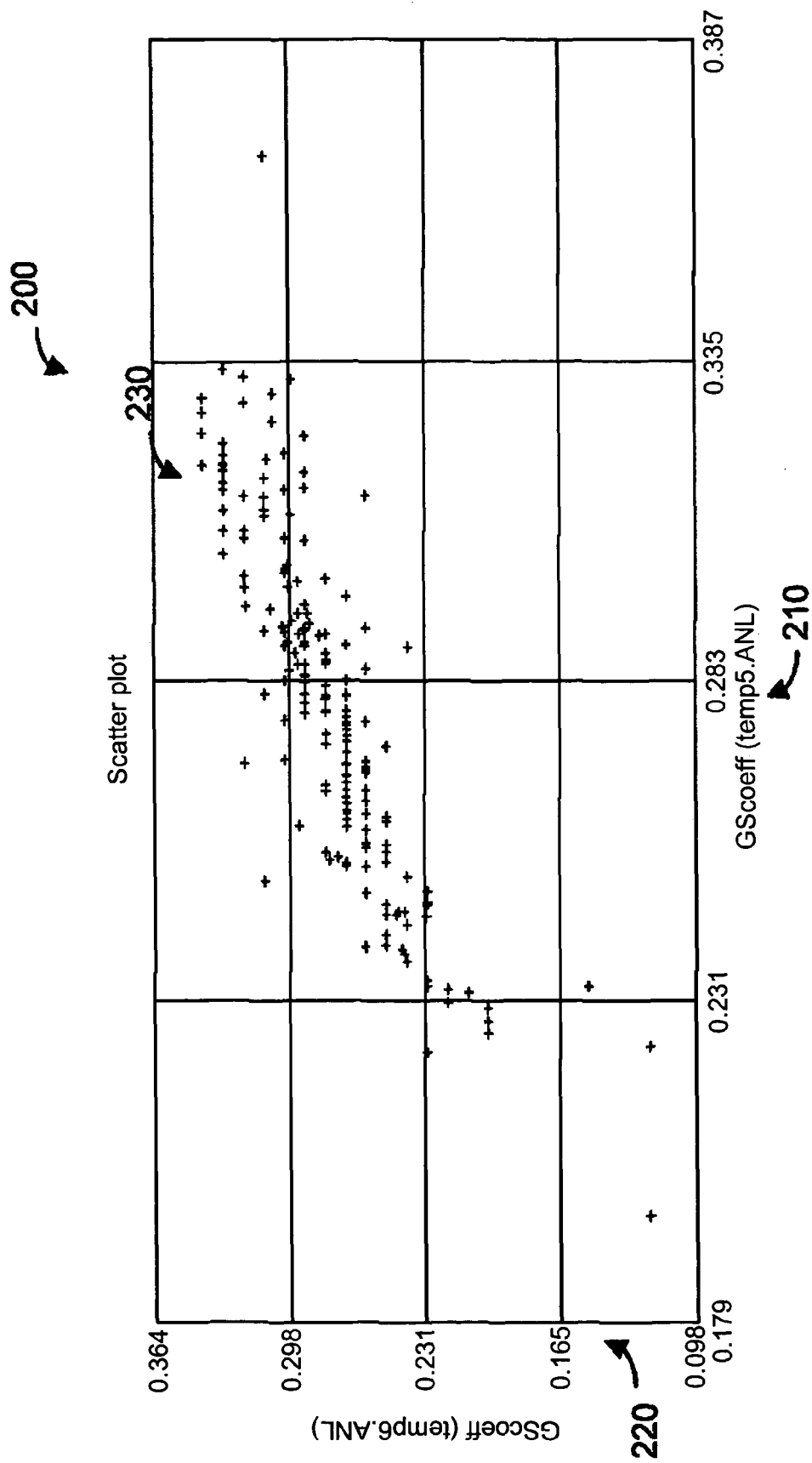
FIG. 2 is a graph illustrating a correlation between a wet chemistry enzymatic gelatinized starch assay to NIR spectrograph results, according to an exemplary embodiment.

Referring now to FIG. 2, a graph 200 illustrating a correlation between a wet chemistry enzymatic gelatinized starch assay to NIR spectrograph results is shown, according to an exemplary embodiment. Starch gelatinization measurement engine 130 is configured to implement a fast and accurate method for measuring gelatinized starch in finished products to reduce the amount of overcooking or undercooking.

A first axis 210 shows the predicted NIR value as milligrams of glucose released from starch. A second axis 220 shows the wet chemistry measurement as milligrams of glucose released from starch. The plurality of plot points 230 represent comparisons of an NIR prediction (using principle component analysis) with a wet chemistry measured value. Graph 200 illustrated that there is a linear regression that can be made that will take an NIR value a predict milligrams of glucose released from starch after a specific amount of time.

Figure 3:
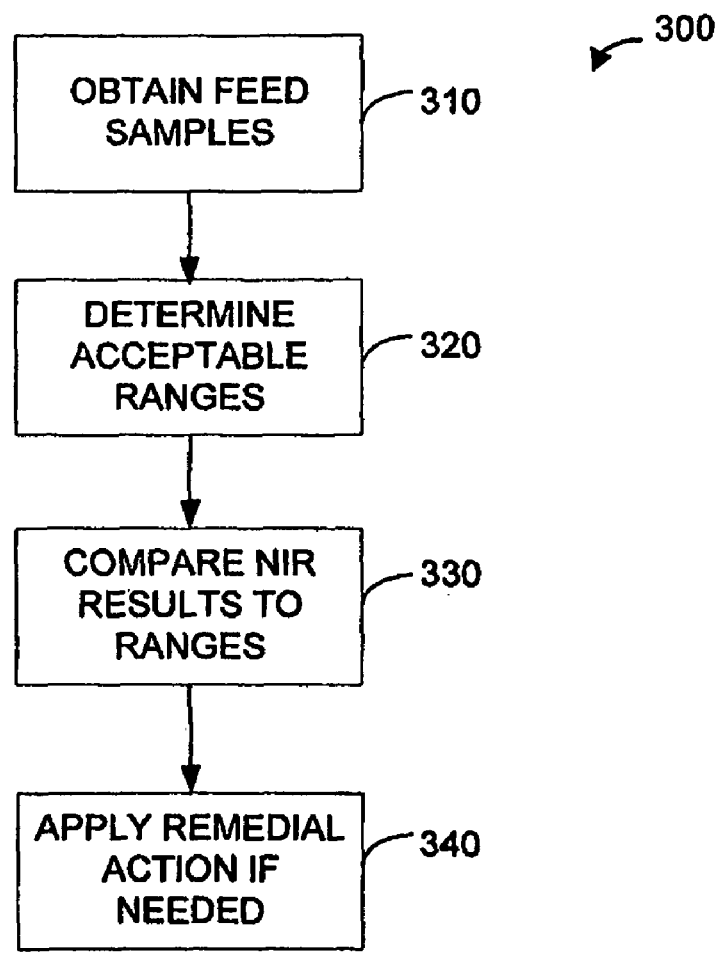
FIG. 3 is a flowchart illustrating a process for determining a degree of starch gelatinization, according to an exemplary embodiment.

Referring now to FIG. 3, a flowchart 300 illustrating a process for determining a degree of starch gelatinization is shown, according to an exemplary embodiment is shown, according to an exemplary embodiment. Although method 300 is shown and described herein as having a specific number of steps performed in a specific order, it should be understood that method 300 may include more, fewer, and/or a different configuration of steps to perform the functions described herein.

In a step 310, samples may be taken on the finished feeds during an extrusion process. According to a first exemplary embodiment, these samples may be processed as a part of the production process. Samples may be allowed to sit for approximately 30 minutes to cool, ground using normal procedures for infrared analysis, and then scanned. Alternatively, measuring may be performed without grinding the sample using, for example, an in-line system.

The above described scanning method may be implemented using any number of variations. For example, scanning may be done using any of a variety of different NIR systems, samples could be ground and loaded in sample cups prior to scanning, some NIR systems can scan whole products in sample cups and some can scan whole product without a sample cup, etc. NIR systems may be chosen based on maximum precision in relation to wet chemistry, to minimize NIR sensitivity to production environments, etc.

Alternatively, the samples may be received from a toll miller producing the animal feed. Toll millers can take samples of the finished product to ship to a facility having the gelatinization engine 130. The engine may be utilized to scan the sample and plot the resultant values in a chart for SPC analysis. System 100 may be configure to implement warning ranges to prevent deviation from acceptable values. Samples over time may be analyzed to develop a history for each toll miller to identify trends and prevent over and/or undercooking of the finished product.

In a step 320, an acceptable range of cooking may be determined based on a variety of factors such as an animal information input. The acceptable range may vary widely based on any number of factors. Other factors may include the ingredients being used, the time of year, the animal environment, a target output, a projected storage time, a storage method, etc.

System 100 is configured to receive animal information input. Animal information input can include any type of information associated with an animal production system. For example, animal information input may be associated with a specific animal or group of animals or type of animals, an animal's environment, an economy related to the animal production, etc.

Information associated with a specific animal or a group or type of animals may include, but is not limited to, a species, a state, an age, a production level, a job, a size (e.g. current, target, variability around, etc.), a morphology (e.g. intestinal), a body mass composition, an appearance, a genotype, a composition of output, a collection of microbial information, health status, a color, etc. The information associated with a specific animal may be any type of information relevant for determining the productivity of the animal.

Species information can include a designation of any type or class of animals such as domestic livestock, wild game, pets, aquatic species, humans, or any other type of biological organism. Livestock may include, but is not limited to, swine, dairy, beef, equine, sheep, goats, and poultry. Wild game may include, but is not limited to, ruminants, such as deer, elk, bison, etc., game birds, zoo animals, etc. Pets may include, but are not limited to, dogs, cats, birds, rodents, fish, lizards, etc. Aquatic species may include, but are not limited to, shrimp, fish (production), frogs, alligators, turtles, crabs, eels, crayfish, etc. and include those species grown for productive purposes (e.g., food products).

Animal state may include any reference or classification of animals that may affect the input requirement or production outputs for an animal. Examples may include, but are not limited to, a reproductive state, including gestation and egg laying, a lactation state, a health state or stress level, a maintenance state, an obese state, an underfed or restricted-fed state, a molting state, a seasonal-based state, a compensatory growth, repair or recovery state, a nutritional state, a working or athletic or competitive state, etc. Animal health states or stress level may further include multiple sub-states such as normal, compromised, post-traumatic (e.g. wean, mixing with new pen mates, sale, injury, transition to lactation, etc.), chronic illness, acute illness, immune response, an environmental stress, etc.

Animal age may include an actual age or a physiological state associated with an age. Examples of physiologic states may include a developmental state, a reproductive state including cycles, such as stage and number of pregnancies, a lactation state, a growth state, a maintenance state, an adolescent state, a geriatric state, etc.

Animal job may include a physiologic state as described above, such as gestation, lactation, growth, etc. Animal job may further include the animal's daily routine or actual job, especially with reference to canine and equines. Animal job may also include an animal movement allowance, such as whether the animal is generally confined versus allowed free movement in a pasture, or, for an aquatic animal, the different water flows the aquatic animal experiences, etc.

Animal size may include the actual weight, height, length, circumference, body mass index, mouth gape, etc. of the animal. The animal size may further include recent changes in animal size, such as whether the animal is experiencing weight loss, weight gain, growth in height or length, changes in circumference, etc.

Animal morphology includes a body shape exhibited by an animal. For example, a body shape may include a long body, a short body, a roundish body, etc. Animal morphology may further include distinct measurement of internal organ tissue changes like the length of intestinal villi or depth of intestinal crypts.

Animal body mass composition may include a variety of composition information such as a fatty acid profile, a vitamin E status, a degree of pigmentation, a predicted body mass composition, etc. The body mass composition generally is a representation of the percentage or amount of any particular component of body mass, such as lean muscle, water, fat, etc.

The body mass composition may further include separate representations composition for individual body parts/sections. For example, body mass composition may include edible component compositions such as fillet yield, breast meat yield, tail meat yield, etc.

Animal appearance may include any measure or representation of an animal appearance. Examples can include the glossiness of an animal's coat, an animal's pigmentation, muscle tone, etc.

Animal genotype may include any representation of all or part of the genetic constitution of an individual or group. For example, an animal genotype may include DNA markers associated with specific traits, sequencing specific segments of DNA, etc. For example, the genotype may define the genetic capability to grow lean tissue at a specific rate or to deposit intramuscular fat for enhanced leanness or marbling, respectively. Additionally, genotype may be defined by phenotypic expression of traits linked to genotypic capacity such as the innate capacity for milk production, protein accretion, work, etc.

Composition of output may include the composition of a product produced by an animal. For example, the composition of output may include the nutrient levels found in eggs produced by poultry or milk produced by dairy cows, the amount, distribution, and/or composition of fat in meat products, etc.

Microbial and/or enzyme information may include current microbial populations within an animal or within an animal's environment. The microbial and/or enzyme information may include measures of the quantity or proportion of gram positive or negative species or other classifications such as aerobes, anaerobes, salmonella species, *E. coli* species, etc. Enzyme information may include the current content, quantity and/or composition of any enzyme, such as protease, amylase, and/or lipase, produced by the pancreas, produced within the gastrointestinal tract, enzymes produced by a microbial population, etc. Microbial and/or enzyme information may further include information about potential nutritional biomass represented by the microbial community that may be used as a feed source for some species (e.g., ruminants, aquatic species, etc.). The microbial and/or enzymatic environment may be monitored using any of a variety of techniques that are known in the art, such as cpn60, other molecular microbiological methods, and in vitro simulation of animal systems or sub-systems.

Animal information input associated with an animal or group of animals' environment may include, but is not limited to, factors related specifically to the environment, factors related to the animal production facility, etc. Animal environment may include any factors not associated with the animal that have an effect on the productivity of the animal or group of animals.

Examples of animal information input related to the environment may include ambient temperature, wind speed or draft, photoperiod or the amount of daylight exposure, acclimation, seasonal effects, air quality, water quality, water flow rate, aeration rate, system substrate, filter surface area, filtration loan capacity, geographic location, mud score, etc. The environmental information may further include detailed information regarding the system containing the animal or animals, such as system size (e.g. the size in square meters, hectares, acres, volume, etc.), system preparation such as using liming, discing, etc., aeration rate, system type, etc. Although some environmental factors are beyond the control of a producer, the factors can usually be modified or regulated by the producer. For example, the producer may reduce draft by closing vents, raise ambient temperature by including heaters or even relocating or moving certain animal production operations to a better climate for increasing productivity. According to another example, an aqua producer may modify nutrient input to an aquatic environment by altering a feed design or feeding program for the animals in the environment. According to an exemplary embodiment, animal information input related to the environment may be generated automatically using an environmental appraisal system (EAS) to calculate a thermal impact estimate for an animal and to provide measurements for the animal's current environment.

Examples of animal information input related to a production facility may include animal density, animal population interaction, feeder type, feeder system, feeder timing and distribution, pathogen loads, bedding type, type of confinement, feathering, lighting intensity, lighting time patterns, etc. Animal information input for a production facility may be modified by a producer to increase productivity or address other production goals. For example, a producer may build additional facilities to reduce population density, obtain additional or different types of feeding systems, modify the type of confinement, etc.

Animal information input associated with economic factors may include, but is not limited to, animal market information. Animal market information may include, but is not limited to, historical, current and/or projected prices for outputs, market timing information, geographic market information, product market type (e.g., live or carcass-based), etc.

Animal information inputs may further include any of a variety of inputs that are not easily classifiable into a discrete group. Examples may include an animal expected output (e.g., milk yield, product composition, body composition, etc.), a user defined requirement, a risk tolerance, an animal mixing (e.g., mixing different animals), variations with an animal grouping, etc., buyer or market requirements (e.g. Angus beef, Parma hams, milk for particular cheeses, etc.), expected and/or targeted growth curves, survival rates, expected harvest dates, etc.

In a step 330, the generated gelatinized starch values may be evaluated to determine whether the level of cooking is within the established range. The NIR scan of a sample will be compared to the original NIR model for gelatinized starch created. If samples are statistically determined to be outliers, defined as something not well described within the model, samples may be flagged for further analysis by a quality control system. Statistical methods employed may include, but are not limited to measuring standard error of prediction, linear regression, standard error of difference, and measure of skew. Models may be updated to reflect changes in processes for precise NIR prediction. All models created may be further verified with random samples to prove their validity. Alternatively, if using SPC, the generated starch gelatinization value may be entered and evaluated using standardized process control rules that are known to predict occurrences that would not be consistent with random variation that occurs within a process. Any non-random tendency suggests that some unexpected change may have occurred within the processing system that is resulting in deviation to expected random movement in results.

In a step 340, corrections to the extruding process may be made based on the evaluation to ensure proper cooking and prevent overcooking and/or undercooking. Exemplary corrections may include adjusting the temperature, such as by adding or reducing the amount of steam, adjusting the pressure, such as by utilizing a back pressure valve (BPV), and/or adding or removing holes in the extrusion plate 125, or, to a lesser extent, adjusting the retention time in the dryer. The corrections may be made by changing an extrusion input, which may be a physical modification to the extruder, such as a valve replacement, a control modification, such as changing an amount of steam control signal, etc.

According to an exemplary embodiment, system 100 may be an automated animal feed production system that automatically implements corrections based on the output from starch gelatinization measurement system 130. Exemplary correction can include increased steam temperature, extra dryer time, reconfiguration of the extrusion plate, etc.

Although described herein as being used following extrusion, system 130 may be utilized to measure cook levels earlier in the feed production process of system 100. For example, measurement can be performed directly off of a feed mixture dryer. Earlier measurement may require correlation of tested values to final product values. Earlier measurement has the advantage of allowing for earlier changes to the extruder or feed product process if necessary.

Although the above system and method is described and shown with reference to an extruded feed, it should be understood that the systems and method may also be applied for other processed finished feeds. Examples may include pellet feeds or other processed material.

Although described herein with reference to animal feed production, it should be understood that the above described system and method may be applied to other fields in accordance with the teachings herein. For example, the system and method may be used in human food production such as cookies, cereals, etc. Further, the system and method may be used to measure float in aqua feeds. In human food applications, cooking processes may be similar to those utilized in animal feeds, but similar measurement concepts may be applied to starches cooked using many other processes that may be utilized such as frying, boiling, or a variety of other cooking methods. Sampling location for measurement of starch gelatinization may be at some intermediate or terminal location where a knowledge of the degree of gelatinization at the sampling point is correlated to the desired final gelatinization of the finished product.

It will be readily apparent to one skilled in the art that varying substitutions and modifications may be made to the methods and system disclosed herein without departing from the scope and spirit of such methods and systems. The methods and systems illustratively described herein suitably may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the methods and systems. Thus, it should be understood that although the present methods and systems have been illustrated by specific embodiments and optional features, modification and/or variation of the concepts herein disclosed may be resorted to by those skilled in the art, and that such modifications and variations are considered to be within the scope of the disclosed methods and systems.

What is claimed is:

1. A system for measuring starch gelatinization in a feed production system, comprising:
    a feed production system configured to generate an extruded feed from a feed mixture using a combination of steam and pressure to cook the feed in an extruder;
    a near infrared spectrometer configured to measure a degree of starch gelatinization for the extruded feed; and
    a starch gelatinization measurement engine configured to generate a measurement of the degree of starch gelatinization in the extruded feed.

2. The system of claim 1, wherein the feed production system is configured to produce a warning whenever starch gelatinization levels are outside of a given range.

3. The system of claim 2, wherein the given range is determined based on animal data associated with an animal targeted for the extruded feed.

4. The system of claim 1, the near infrared spectrometer includes a plurality of equations correlating wet chemistry starch gelatinization results to NIR gelatinization results.

5. The system of claim 1, wherein the feed production system is configured to modify an extrusion input based on the output of the starch gelatinization measurement engine.

6. The system of claim 1, the system further including a statistical process control system configured to detect trends in starch gelatinization for the feed.

7. The system of claim 6, wherein the feed production system is configured to produce a warning whenever starch gelatinization levels trending towards the periphery of a given range.

8. The system of claim 1, wherein the near infrared spectrometer is configured to measure a degree of starch gelatinization for the extruded feed using an enzymatic incubation assay.

9. A method for measuring starch gelatinization in a feed production system, comprising:
    receiving an extruded feed created from a feed mixture using a combination of steam and pressure to cook the feed in an extruder; and
    generating a near infrared spectrograph to determine a degree of starch gelatinization in the extruded animal feed.

10. The method of claim 9, further including generating a warning whenever starch gelatinization levels are outside of a given range.

11. The method of claim 10, wherein the given range is determined based on animal data associated with an animal targeted for the extruded feed.

12. The method of claim 9, wherein generating a near infrared spectrograph to determine the degree of starch gelatinization includes correlating wet chemistry starch gelatinization results to components of the NIR spectrograph.

13. The method of claim 9, further including modifying an extrusion input based on the output of the starch gelatinization measurement engine.

14. The method of claim 9, further including implementing a statistical process control system to detect trends in starch gelatinization for the animal feed.

15. The method of claim 14, further including generating a warning whenever starch gelatinization levels are trending towards the periphery of a given range.

16. The method of claim 9, further including using an enzymatic incubation assay to measure the degree of starch gelatinization for the extruded animal feed.

17. A system for measuring starch gelatinization in a feed production system, comprising
    a feed production system configured to generate an animal feed from a feed mixture;
    a near infrared spectrometer configured to measure a degree of starch gelatinization for the animal feed; and
    a starch gelatinization measurement engine configured to generate a measurement of the degree of starch gelatinization in the animal feed.

18. The system of claim 17, wherein the feed production system is configured to produce a warning whenever starch gelatinization levels are outside of a given range.

19. The system of claim 18, wherein the given range is determined based on animal data associated with an animal targeted for the animal feed.

20. The system of claim 17, wherein the near infrared spectrometer includes a plurality of equations correlating wet chemistry starch gelatinization results to NIR gelatinization results.

21. The system of claim 17, wherein the feed production system is configured to modify feed production input based on the output of the starch gelatinization measurement engine.

22. The system of claim 17, the system further including a statistical process control system configured to detect trends in starch gelatinization for the animal feed.

23. The system of claim 22, wherein the feed production system is configured to produce a warning whenever starch gelatinization levels trending towards the periphery of a given range.

24. The system of claim 17, wherein the near infrared spectrometer is configured to measure a degree of starch gelatinization for the animal feed using a enzymatic incubation assay.

* * * * *